United States Patent [19]

Mathur et al.

[11] 4,246,241

[45] Jan. 20, 1981

[54] PROCESS FOR SELECTIVE REMOVAL OF SODIUM SULFATE FROM AN AQUEOUS SLURRY

[75] Inventors: Indresh Mathur; Dale M. Bristow (nee Elley), both of Sarnia; Allan R. Knight, Petrolia, all of Canada

[73] Assignee: Dow Chemical Canada Limited, Sarnia, Canada

[21] Appl. No.: 57,916

[22] Filed: Jul. 16, 1979

[30] Foreign Application Priority Data

Mar. 26, 1979 [CA] Canada ................................. 324172

[51] Int. Cl.$^2$ .......................... C25B 1/16; C25B 1/26; C01D 3/04
[52] U.S. Cl. .................................. 423/179; 210/634; 422/261; 204/128
[58] Field of Search ................... 210/21, 22; 422/902, 422/255, 256, 261; 204/128; 423/179, 208

[56] References Cited

U.S. PATENT DOCUMENTS

| | | | |
|---|---|---|---|
| 3,130,016 | 4/1964 | Grier | 423/179 |
| 3,168,379 | 2/1965 | Miller | 422/261 X |
| 3,236,609 | 2/1966 | MacKinnon | 423/179 |
| 3,363,995 | 1/1968 | Driskell et al. | 423/179 |
| 3,385,674 | 5/1968 | Kolasinri | 423/208 |
| 3,395,098 | 7/1968 | Hess et al. | 422/256 X |
| 3,800,026 | 3/1974 | Morgan | 422/261 X |
| 3,983,032 | 9/1976 | Hess et al. | 210/21 X |
| 4,029,744 | 6/1977 | Li et al. | 210/22 RX |
| 4,058,410 | 11/1977 | Dietzel et al. | 422/261 X |
| 4,094,956 | 6/1978 | Bieler | 423/179 |
| 4,119,508 | 10/1978 | Yokota et al. | 204/128 |
| 4,145,265 | 3/1979 | Nakata et al. | 204/128 X |
| 4,151,261 | 4/1979 | Poncha et al. | 423/208 X |

*Primary Examiner*—Arthur C. Prescott
*Attorney, Agent, or Firm*—Mert B. Lilly

[57] ABSTRACT

A process for selectively removing sodium sulfate and sodium hydroxide from an aqueous slurry containing sodium chloride, sodium sulfate and sodium hydroxide, which comprises contacting the slurry in a countercurrent wash step with cool water to remove sodium sulfate and sodium hydroxide therefrom.

13 Claims, 3 Drawing Figures

4,246,241

PROCESS FOR SELECTIVE REMOVAL OF SODIUM SULFATE FROM AN AQUEOUS SLURRY

BACKGROUND OF THE INVENTION

In the electrochemical production of chlorine and sodium hydroxide, brine containing sodium chloride and minor amounts of other salts, such as calcium sulfate, is fed to electrolytic cells. Since the calcium may interfere with cell operation, it is customary practice to precipitate the calcium with a carbonate, such as sodium carbonate. The calcium carbonate precipitate is removed from the brine before it is fed to the cell, but the sodium sulfate produced during such precipitation is carried into the cell along with the sodium chloride. Chlorine in gaseous form is taken off overhead from the cell and sodium hydroxide in the cell effluent is recovered in more concentrated form from evaporators. The cell effluent contains substantial amounts of sodium chloride which is customarily returned to the brine feed and recycled through the electrolytic cells.

The sodium sulfate has a decreased solubility in concentrated sodium hydroxide solutions, and precipitates out in the evaporators along with the sodium chloride. Sodium sulfate tends to build up on recycle through the evaporators and may cause decreased current efficiency in the electrolytic cell as well as high caustic losses during the separation of the caustic from the cell effluent. Consequently, it is desirable to remove as much of the sodium sulfate as possible from the sodium chloride before it is returned as brine feed to the electrolytic cells. It is also desirable that the sodium sulfate be removed in as concentrated form as possible in order to reduce capital expenditures necessary to further process the sulfate stream for discard or for production of a salable chemical. It is also desirable to remove all but a minor portion of the sodium hydroxide from the sodium chloride that is to be used as brine feed for the cells in order to maintain the proper pH level in the cells.

One way of approaching this overall problem, and a suggested process for solving it, is set forth in U.S. Pat. No. 4,087,253. This patent proposes using a caustic solution of less than 35% sodium hydroxide to effect separation of the sodium sulfate from the sodium chloride salt. While in theory this problem of separating sodium sulfate and sodium hydroxide from sodium chloride could be resolved by reference to equilibrium graphs or charts showing the solubility of these salts in aqueous solution, there are certain secondary phenomena, such as the formation of the triple salt of sodium hydroxide-sodium sulfate-sodium chloride, that prevent dependable prediction of optimum concentrations, temperatures and flow rates for the separation of these salts. Consequently, the solution to this problem of separating the sodium sulfate and sodium hydroxide from highly concentrated solutions or slurries of sodium chloride must depend upon empirical experimentation.

SUMMARY OF THE INVENTION

It has now been found that sodium sulfate and sodium hydroxide may be removed from an aqueous slurry containing these compounds and sodium chloride in particulate form, in a saturated aqueous solution thereof, by contacting such a slurry in a countercurrent wash step with cool water.

DETAILED DESCRIPTION OF THE INVENTION

The process of the present invention has been found to be particularly useful in the separation of sodium sulfate and sodium hydroxide from the salt cake derived from centrifuge or flat bed filters that are downstream from the evaporators employed to concentrate sodium hydroxide in the cell effluent from chloralkali electrolytic cells. Water is added to the salt scrolled from the salt cake to produce a slurry for treatment hereunder. It will be apparent to one skilled in the art that the present invention is equally applicable to the treatment of any slurry having compositions as described herein, regardless of the source of that slurry. The slurries to which the present invention is applicable are those containing sodium hydroxide, sodium sulfate and sodium chloride, the sodium chloride being present in particulate form in a saturated aqueous solution of this salt. These salts may also be present in various complex forms, such as the triple salt ($NaOH \cdot NaCl \cdot Na_2SO_4$). It is possible to wash such a slurry in many ways, such as the use of centrifuges and equilibrium filters where the salt cake is stirred in an aqueous environment and then the supernatant fluid is passed through a filter bed. Relatively warm, or even hot, process water may be employed. It has been found, however, that a very substantial improvement in the percent of sodium sulfate and sodium hydroxide removed from such a slurry can be achieved by employing a wash step wherein cool wash water contacts the slurry to be treated in a countercurrent relationship. There are many forms of equipment that may be employed for this countercurrent washing of the slurry, and the particular type of apparatus that is employed does not form a part of the present invention. It is only essential that the slurry be contacted with cool wash water in a countercurrent relationship, so that the sodium sulfate and sodium hydroxide are removed in the overflow stream and the purified sodium chloride is recovered from the underflow stream of the wash column. In order to more fully describe the present invention, the invention will be discussed in detail in connection with a particular embodiment thereof disclosed in the accompanying drawings, wherein FIG. 1 is a flow sheet representing a chloralkali plant and FIG. 2 is a diagrammatic drawing of the wash column hereinafter described.

Figure 1:
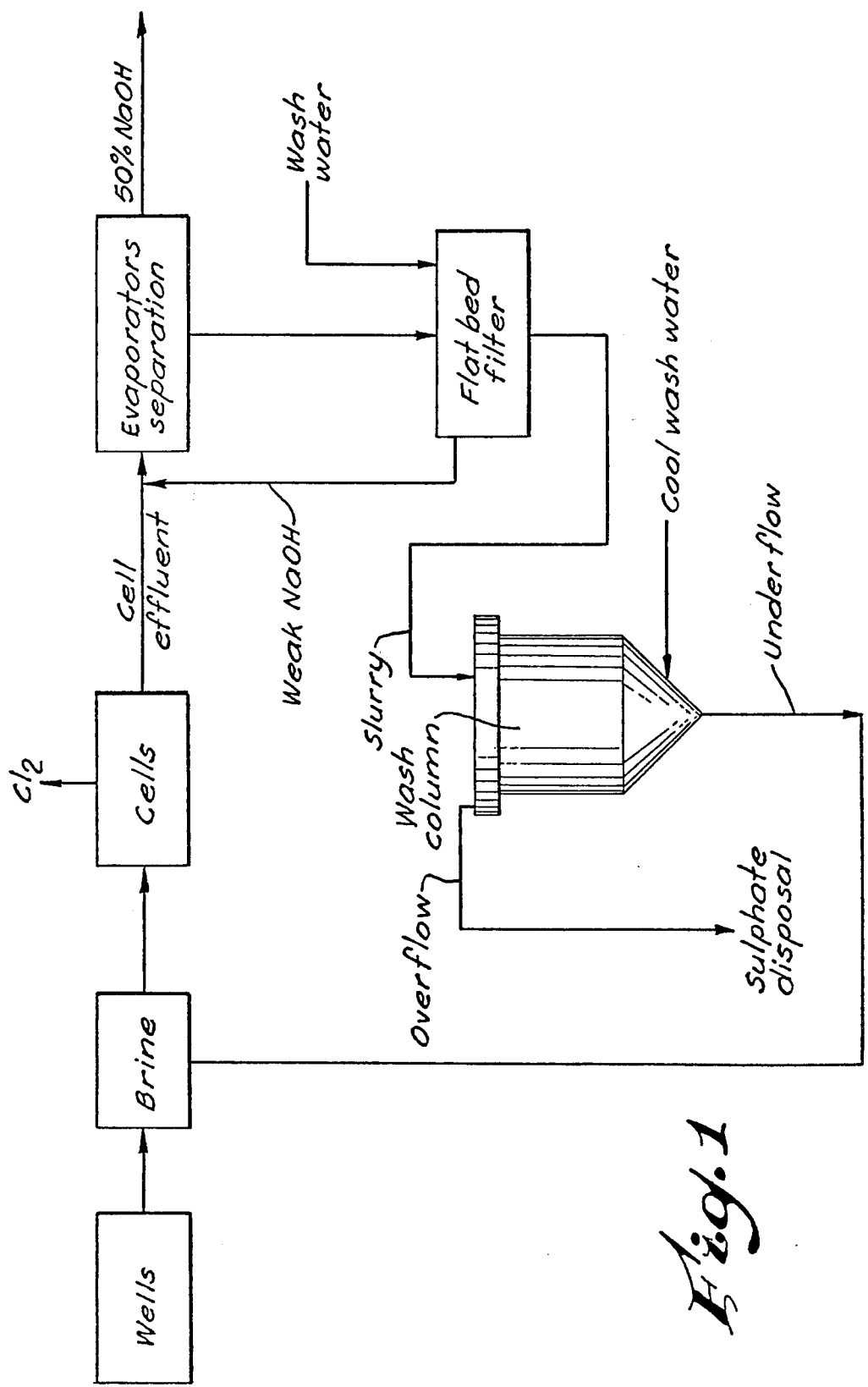

Referring now to FIG. 1, salt is customarily mined from wells which bring the salt up to the surface in the form of aqueous brine. The brine is then pumped to electrolytic cells from which chlorine is recovered in gaseous form and the cell effluent then directed to a series of evaporators from which is obtained caustic in a more concentrated form, such as a 50% solution. From the evaporators, an aqueous, caustic slurry of inorganic salts is directed to a flat bed filter. Salt is scrolled off the filter and water added which produces a slurry containing varying amounts of sodium chloride as well as sodium hydroxide and sodium sulfate. It will be understood that references herein to "percentages", other than those respecting settled volume, are references to percent by weight unless otherwise stated. It is preferred to maintain the amount of sodium hydroxide in such a slurry below about 10%, since sodium hydroxide in excess of this amount suppresses the dissolution of sodium sulfate in the wash water and can cause difficulty in the subsequent production of sulfate salts. The present process may be practiced, however, with NaOH levels as high as about 16%. The most effective removal of the sodium sulfate has been found to occur when the amount of sodium sulfate in the slurry is between about 4 to about 7%. The amount of water in the slurry is regulated in order to obtain a settled volume which will range from 15 to 30%. The term "settled volume" as used herein means that percent of the total volume of the aqueous slurry that is occupied by the insoluble material in suspension. In the particular type of wash column employed and as described hereafter, a slurry having a settled volume in excess of 22% is preferred. The flow rate at which the slurry is introduced into the wash column and the settled volume of the salt slurry will vary, of course, with the particular size and type of wash column employed. Settled volumes as high as 40% could be used with some wash columns.

Figure 2:
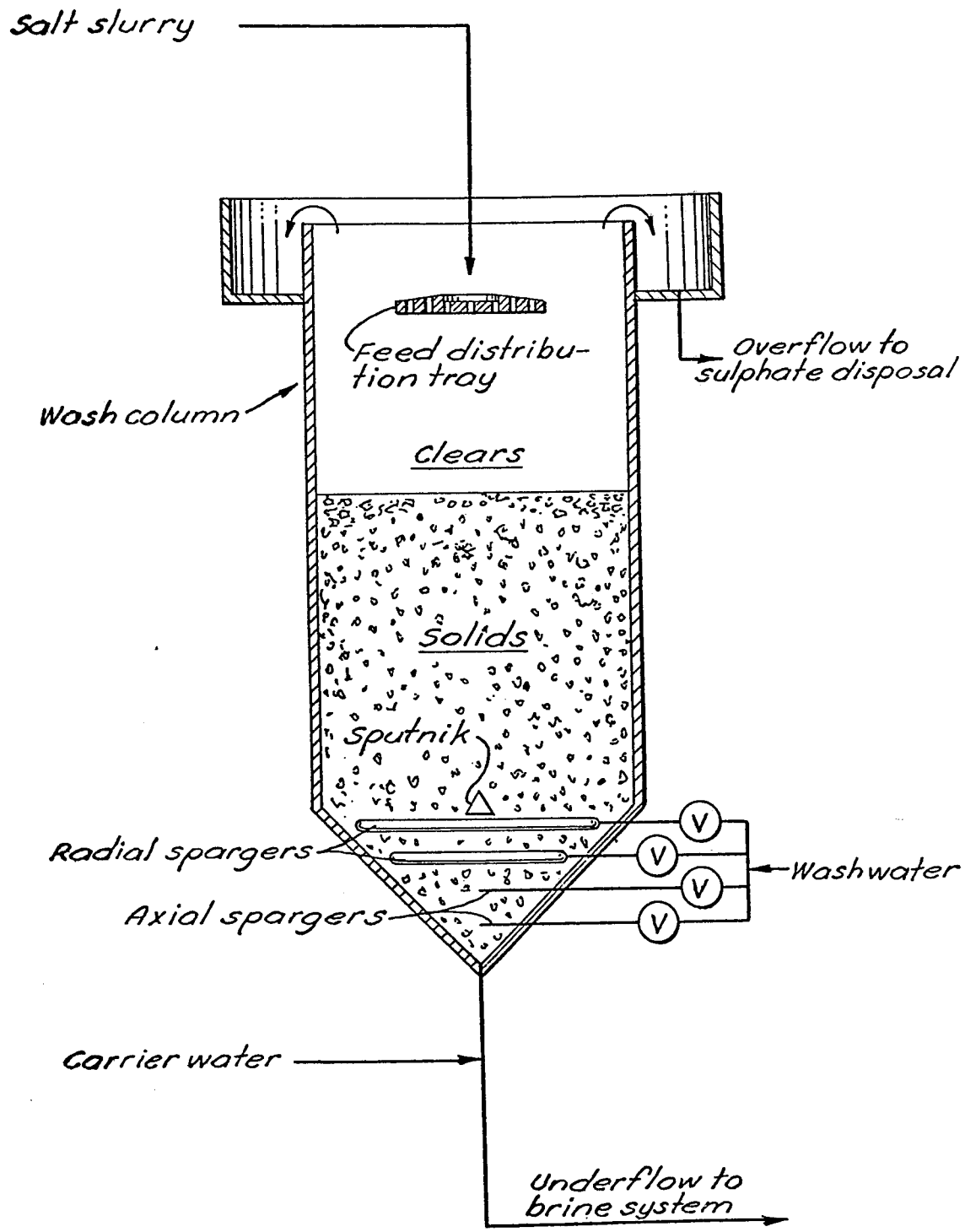

The slurry from the flat bed filter is fed to the wash column, shown in greater detail in FIG. 2, at a temperature ranging from about 120° F. to about 170° F. This slurry is directed onto a feed distribution tray in the wash column which aids in dispersing the slurry uniformly over the upper portion of the column. As the slurry moves downwardly through the column, a phase designated as "clears" or supernatant liquid is formed above a phase indicated as "solids" composed essentially of loosely packed, particulate sodium chloride. A conical member designated as a "sputnik" is located near the bottom portion of the wash column and performs the function of preventing or diminishing the channeling of the more solidly packed, particulate sodium chloride.

As shown in FIG. 2, wash water is introduced near the bottom portion of the wash column through a plurality of spargers which direct the water upwardly through a series of small holes formed in two radial or ring like spargers and two axial spargers. Since the water enters the wash column under pressure, it helps to prevent or reduce channeling of the particulate sodium chloride in the bottom portion of the wash column. The temperature of the wash water may vary from about 45° F. to about 120° F. At 120° F. only about 70% removal of the $Na_2SO_4$ is obtained, so that it will be necessary to reduce the wash water temperature to 100° F. in commercial operations that cannot tolerate this much build-up of sodium sulfate in the recycled cell effluent. Greatly improved removal of sodium sulfate is achieved, however, when the wash water is below about 80° F. and still more remarkable removal of over 90% of the sodium sulfate from the slurry can be achieved by maintaining the wash water temperature below about 60° F. The flow rate of wash water will, of course, depend upon the amount of slurry being introduced to the wash column as well as the rate of underflow. As a particular example of one embodiment of the invention, however, when the amount of slurry supplied is in the range of 140 gallons per minute, the wash water flow rate may vary from 30 to 45 gallons per minute. The overflow from the wash column shown in FIG. 2 amounts to the difference between the volume input of the slurry and wash water less the volume of materials removed as underflow. For example, when slurry is supplied at the rate of 140 gallons per minute, the wash column and the wash water input is 40 gallons per minute, an underflow rate of 32 gallons per minute will produce an overflow of approximately 148 gallons per minute. The most efficient removal of sodium hydroxide and sodium sulfate from the slurry occurs when the overflow equals or exceeds the rate of flow of the slurry. This overflow carries off a major portion of the sodium sulfate and sodium hydroxide. Under the preferred conditions, with cool wash water of less than about 80° F., and preferably less than 60° F., approximately 95% of the sodium hydroxide and about 90% of the sodium sulfate can be removed from the slurry being treated. This overflow, which contains relatively large amounts of sodium sulfate and sodium hydroxide in combination with sodium chloride, is sent to the sulfate disposal plant, where it may be made into a salable product containing sulfate or some form of environmentally acceptable discard.

The underflow from the wash column contains the purified sodium chloride and typically contains less than about 1% each of sodium hydroxide and sodium sulfate. The flow rate of the underflow is regulated by the operation of the wash column and must be sufficiently high to avoid salt build-up which will plug the underflow pipe lines. In one particular embodiment of the present invention wherein the slurry is introduced at the rate of 140 gallons per minute and wash water was introduced at the rate of 40 gallons per minute, an underflow of 32 gallons per minute was found to provide satisfactory operation of the wash column. This underflow contains a relatively high percentage of particulate sodium chloride, so that the settled volume of the underflow will vary from 40 to 90%. Carrier water is introduced, as shown in FIG. 2, in order to dilute the underflow and to better enable it to be pumped (without plugging of the pipe lines) to the brine tanks for subsequent recycling through the electrolytic cells.

The following examples are set forth by way of illustration and not by way of limitation, it being understood that the pesent invention is limited only as defined in the claims attached hereto.

EXAMPLES

Example 1

A wash column, as diagrammatically shown in FIG. 2, was installed in a chloralkali plant in the manner shown in the flow chart in FIG. 1. The wash column in this particular embodiment was six feet in diameter and twenty-one feet tall. Salt scrolled off flat filters downstream from the evaporators was slurried with water and this slurry was then fed to the wash column at a temperature in the range of about 120° F. to about 170° F. and at a flow rate of about 140 gallons per minute, with variations as low as 100 gallons per minute and as high as 190 gallons per minute. A typical composition of the slurry was about 7% sodium hydroxide, about 5% sodium sulfate and about 35% sodium chloride with the balance being water. The typical settled volume of this slurry was about 23%. The composition and settled volume of the slurry feed varied, however, within the ranges above set forth.

The slurry feed coming in at the top of the wash column was directed onto a feed distribution tray which is in the form of an "X" with slots cut through the arms to disperse the slurry uniformly across a broad cross section of the column. Optimum operation of the wash column was obtained when the bed level of the salt (or "solids" as shown in FIG. 2) was about eight feet deep or a 40% level. The bed level is controlled by the rate of flow of the underflow, which is preferably maintained at about 32 gallons per minute.

Wash water is introduced at the bottom of the column at a flow rate between 32 and 40 gallons per minute, the higher rate being preferred because it assists in reducing solid salt build-up in the column. The temperature of the wash water was varied, and the results of such variation are discussed in Examples 2 and 3. The temperature of the wash water is preferably maintained below about 60° F.

When the slurry is fed into the wash column at a rate of 140 gallons per minute and wash water is introduced at the rate of 40 gallons per minute, and the underflow is removed from the wash column at 30 gallons per minute, the overflow rate is thereby determined as 150 gallons per minute. The overflow from the wash column is removed at the top of the vessel into a launder where it is collected and sent to the sulfate disposal plant. When operating with typical slurry compositions and under preferred conditions, all as described above, the overflow contains approximately 6.5% sodium hydroxide, about 4.5% sodium sulfate and about 21% sodium chloride. It has been found that under the conditions stated in this example, over 95% of the sodium hydroxide and over 90% of the sodium sulfate are removed in the underflow from the slurry that is fed into the wash column.

Example 2

Figure 3:
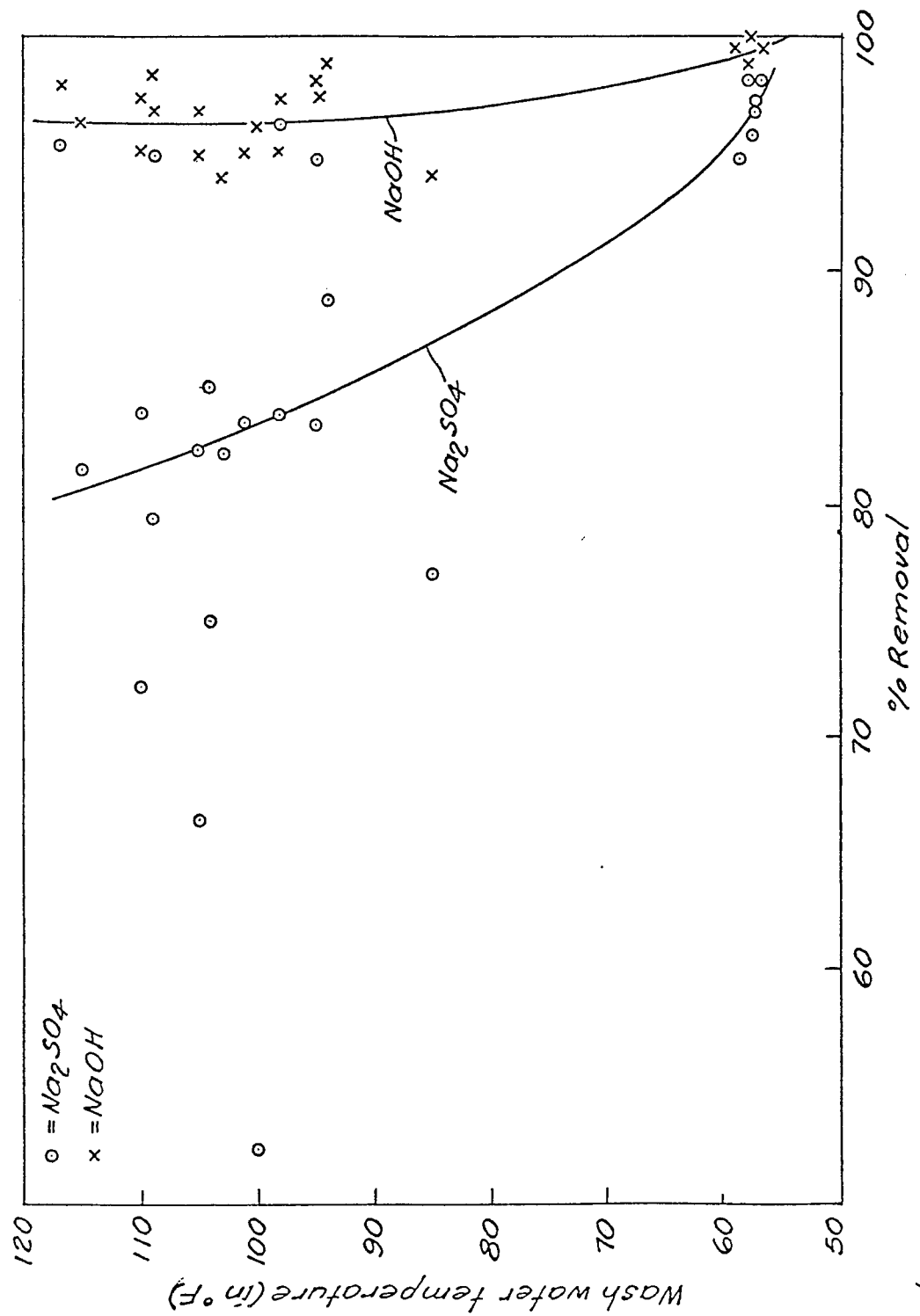

The wash column described in Example 1 wash operated at different wash water temperatures to determine the effect of wash water temperature on the percent removal of sodium hydroxide and sodium sulfate. The results are presented graphically in FIG. 3. Wash water temperature seems to have only a slight effect on the percentage of sodium hydroxide removed from the slurry, which consistently runs from about 95 to 99%. At temperatures above about 80° F., the percentage of sodium sulfate removed varies widely even at the same wash water temperature, indicating that a number of factors affects the amount of sodium sulfate removed in the overflow. However, even here lower ones of these wash temperatures show an increase in the amount of sodium sulfate removed. At wash water temperatures below about 60° F., however, approximately 95% to 98% removal of the sodium sulfate is consistently attained.

Example 3

To further illustrate the invention, operating data relating to the operation of the wash column that has been described and shown in Example 1 is set forth in the following Table:

invention. For example, the present invention is applicable to the removal of sodium sulfate and sodium hydroxide from admixture with sodium chloride regardless of the source of that particular admixture, and is not restricted to such admixtures occurring in a chloralkali plant. References herein to "overflow" and "underflow" define relative positioning of these means of removing fluids and/or slurries from the wash column, and should not be interpreted to mean that "overflow" necessarily refers to removal over the top of the column of that "underflow" means removal at the bottom of the column. Other variations and modifications of the present invention will become apparent to those skilled in the art, and the present invention is to be limited only as set forth in the following claims.

What is claimed is:

1. A process for separating sodium hydroxide and sodium sulfate from a slurry containing the same in admixture with sodium chloride in particulate form, which comprises feeding the slurry into a wash column in such a manner that it moves downwardly through the wash column, introducing a stream of wash water into the wash column so that it moves upwardly through the column in countercurrent relationship with said slurry, and removing wash water from the column at a position sufficiently upward from the point of introduction of the wash water that a major portion of the sodium hydroxide and sodium sulfate from said slurry are removed therewith.

2. A process as defined in claim 1 wherein the wash water is introduced at a temperature of about 80° F. or below.

3. A process as defined in claim 1 wherein the wash water is introduced at a temperature of about 60° F. or below.

4. A process for separating sodium hydroxide and sodium sulfate from a slurry containing the same in admixture with sodium chloride in particulate form, which comprises feeding said slurry into the upper portion of a wash column in such a manner that the slurry moves downwardly through the wash column, introducing a stream of wash water into the lower portion of the wash column in such a manner that the wash water moves upwardly through the column in countercurrent relationship to the said slurry, removing overflow fluid from the wash column at or near the top of the wash column, said overflow fluid carrying with it most of the sodium hydroxide and sodium sulfate from said slurry, and recovering the purified sodium chloride

TABLE

| | FEED Sample Analysis | | SALT COLUMN | | UNDERFLOW | | | OVERFLOW | | | % Removal | |
|---|---|---|---|---|---|---|---|---|---|---|---|---|
| Flow Rate (GPM) | % NaOH | % Na2SO4 | Wash Flow (GPM) | Wash Temp (F) | Flow Rate (GPM) | % NaOH | % Na2So4 | Flow Rate (GPM) | % NaOH | % Na2SO4 | % NaOH | % Na2SO4 |
| 90 | | | 40 | 59 | 27 | .79 | 1.97 | | | | | |
| 110 | | | 40 | 59 | 27 | .16 | | | | | | |
| | 7.9 | 4.0 | 40 | 58 | 30 | .25 | .30 | 129 | 6.7 | 3.83 | 99.2 | 98.1 |
| 130 | 8.4 | 2.5 | 40 | 58 | 30 | .08 | .47 | 125 | 6.8 | 2.9 | 99.1 | 95.7 |
| 134 | 9.6 | 4.6 | 40 | 58 | | .54 | .72 | | 8.6 | 4.2 | 98.9 | 97.3 |
| 140 | 9.0 | 2.1 | 40 | 59 | 21 | .19 | .69 | 83 | 7.2 | 3.3 | 99.7 | 94.7 |
| 140 | 8.4 | 3.8 | 40 | 58 | 21 | .07 | .65 | | 6.5 | 3.2 | 99.5 | 96.9 |
| 150 | 11.8 | 3.0 | 36 | 57 | 24 | .19 | .21 | | 7.5 | 2.9 | 99.7 | |
| 170 | 10.5 | 3.5 | 36 | | 19 | .11 | .65 | | 8.9 | 3.3 | 99.9 | 97.3 |

It will become apparent from the above detailed description of the invention, as well as the Examples above set forth, that many variations and modifications may be made in the particular embodiments of the invention set forth herein without departing from the in the underflow from the lower portion of the wash column.

5. A process for selectively removing sodium hydroxide and sodium sulfate from an aqueous slurry containing the same along with sodium chloride in particulate form, which comprises washing said slurry in a countercurrent contact stage with cool wash water at a temperature below about 100° F., removing the wash water from said slurry and with it a major portion of the sodium sulfate and sodium hydroxide present in this slurry, and collecting in the underflow from said washing stage the purified sodium chloride.

6. A process as defined in claim 5 wherein the wash water is introduced at a temperature of about 60° F. or below.

7. A process for removing sodium hydroxide and sodium sulfate from a slurry containing 20 to 45% by weight sodium chloride, 2 to 7% by weight sodium sulfate and 4 to 16% by weight of sodium hydroxide, the settled volume of the slurry being within the range of 15 to 30%, which comprises feeding said slurry into the upper portion of a wash column in such a manner that the slurry moves downwardly through the wash column, sparging a stream of wash water at a temperature below about 100° F. into the lower portion of the wash column in such a manner that the wash water moves upwardly through the column in countercurrent relationship to said slurry, removing overflow fluid at or near the top of the wash column, said overflow fluid carrying with it a major portion of the sodium hydroxide and sodium sulfate contained in said slurry, and recovering the purified sodium chloride in the underflow from the lower portion of the wash column.

8. A process as defined in claim 7 wherein the wash water is sparged into the wash column at a temperature of about 80° F. or below.

9. A process as defined in claim 8 wherein the overflow is removed from the wash column at a rate at least equal to the rate at which the slurry is fed into the wash column.

10. A process for removing a major portion of the sodium sulfate and sodium hydroxide from a slurry containing 20 to 35% sodium chloride, 2 to 7% sodium sulfate and 4 to 16% sodium hydroxide, the settled volume of the slurry being in the range of 15 to 30%, which comprises feeding the slurry into a wash column in such a manner that it moves downwardly through the wash column, introducing a stream of wash water into the column so that it moves upwardly through the column in countercurrent relationship with said slurry, and removing overflow fluid from the wash column at or near the top of the wash column, said overflow fluid carrying with it a major portion of the sodium hydroxide and sodium sulfate contained in said slurry.

11. A process for selectively removing sodium hydroxide and sodium sulfate from admixture with sodium chloride, which comprises making an aqueous slurry of such mixture, contacting the slurry in a countercurrent relationship with cool wash water, and removing the wash water from the slurry and with it a major portion of the sodium hydroxide and sodium sulfate contained in the slurry.

12. In an electrolytic process for making chlorine and sodium hydroxide wherein cell effluent is concentrated to a mixture containing sodium hydroxide, sodium sulfate and composed principally of sodium chloride, the improved process for separating sodium hydroxide and sodium sulfate from said mixture which comprises making an aqueous slurry of such a mixture wherein the sodium chloride is present in particulate form, contacting such slurry in a countercurrent relationship with cool wash water, and removing the wash water from the slurry and with it a major portion of the sodium hydroxide and sodium sulfate contained in the slurry.

13. A process as defined in claim 12 wherein the wash water is at a temperature of about 60° F. or below.

* * * * *